United States Patent [19]

Denton et al.

[11] 4,270,759
[45] Jun. 2, 1981

[54] COMBINATION THRUST WASHER AND SEAL ARTICLE, APPARATUS AND METHOD

[75] Inventors: Dennis N. Denton, Gaston County; Martin E. Benjamin, Gastonia, both of N.C.

[73] Assignee: Garlock Inc., Longview, Tex.

[21] Appl. No.: 27,004

[22] Filed: Apr. 4, 1979

Related U.S. Application Data

[62] Division of Ser. No. 768,070, Feb. 14, 1977, Pat. No. 4,175,756.

[51] Int. Cl.³ .................... B62D 55/08; F16S 15/24
[52] U.S. Cl. ......................... 277/1; 277/92; 277/189; 305/58 PC; 308/36.1
[58] Field of Search ............... 277/1, 189, 212 F, 205, 277/92; 308/36.1, 187.1, 187.2; 305/58 PC, 59, 41

[56] References Cited

U.S. PATENT DOCUMENTS

| 3,117,796 | 1/1964 | Liebig | 277/205 |
| 3,123,367 | 3/1964 | Brummer et al. | 277/205 |
| 3,948,574 | 4/1976 | Baylor | 277/92 |

*Primary Examiner*—Robert I. Smith
*Attorney, Agent, or Firm*—Schovee & Boston

[57] ABSTRACT

A thrust washer is combined with a seal for preventing contaminants from entering into the assembly and doing corrosion damage. In one embodiment, a spring shackle bracket assembly thrust washer is provided with an elastomeric seal bonded thereto and having a sealing lip extending from the I.D. of the washer axially into the space between the spring eye and the shackle pin. In addition, a layer of the seal material on a radial face of the washer can prevent wear between the washer and the adjacent bracket.

8 Claims, 3 Drawing Figures

COMBINATION THRUST WASHER AND SEAL ARTICLE, APPARATUS AND METHOD

This is a division of application Ser. No. 768,070 filed Feb. 14, 1977, and now U.S. Pat No. 4,175,756.

BACKGROUND OF THE INVENTION

1. Field of the Invention

This invention relates to thrust washers such as are used in spring shackle bracket assemblies as on trucks and other vehicles.

2. Description of the Prior Art

Thrust washers used in prior practice served only as thrust devices and were not able to prevent contaminants such as salt, water, chemicals, etc. from entering the assembly and causing corrosion damage in and around mating components.

It is an object of the present invention to provide a new combination thrust washer and seal article, apparatus and method for preventing contaminants from entering into such an assembly and to thus prevent corrosion damage and also to prevent wear between a thrust washer and the adjacent bracket.

It is another object of this invention to extend the life of the assembly, to provide a definite cost savings in repairs, and to reduce the extended service time of the prior art due to the difficulty in removing worn bushings in spring shackle bracket assemblies.

SUMMARY OF THE INVENTION

A combination thrust washer and seal for use, for example, in a spring shackle bracket assembly and comprising an annular ring-shaped metal thrust washer and an annular seal material covering or at least partially covering the washer and having a sealing lip for preventing corrosion action on mating components by sealing out unwanted contaminants. In one embodiment, the seal material is an elastomeric material bonded to the washer and having a wear resistant layer substantially covering at least one radial face of the washer and including a seal body having an anchor portion and an axially extending sealing lip having a proximal end adjacent the I.D. of the washer and extending axially away from the washer on the opposite side from said layer and having a radially enlarged distal end for sealing the space between the I.D. of the spring eye and the O.D. of the shackle pin. The wear resistant layer can prevent wear between a steel thrust washer rubbing against an aluminum bracket.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE PREFERRED EMBODIMENTS

Figure 1:
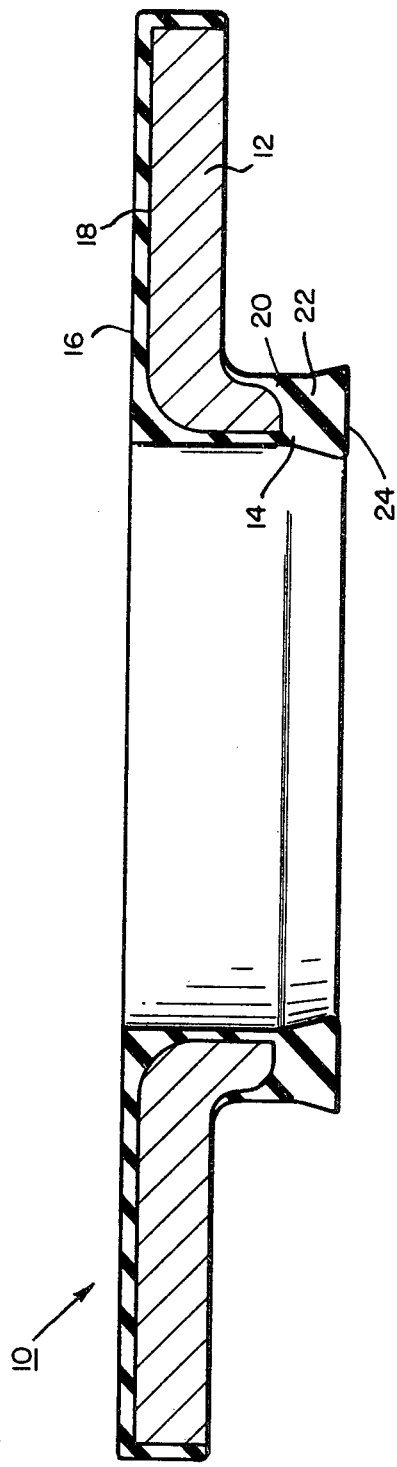
FIG. 1 is a cross-sectional view through one combination thrust washer and seal according to the present invention.

With reference now to the drawings, FIG. 1 shows a preferred combination thrust washer and seal 10 according to the present invention comprising an annular ring-shaped thrust washer 12 and an annular elastomeric seal body 14 bonded to the thrust washer 12. The elastomeric material preferably also includes a wear-resistant layer 16 substantially covering an outer (meaning axially outwardly away from the application) radial face 18 of the thrust washer. The seal body 14 includes an anchor portion 20 bonded to the washer and an axially extending sealing lip 22 having a proximal end adjacent the I.D. of the washer 12 and extending axially away from the washer and having a distal sealing end 24. In this embodiment the distal end 24 is enlarged both radially inwardly and radially outwardly from the remainder of the sealing lip 22. The distal end 24 has an I.D. smaller than the I.D. of the thrust washer and has a normal or uncompressed radial thickness that is greater than the radial distance of the space to be sealed (such as the space 26 in FIG. 2).

Figure 2:
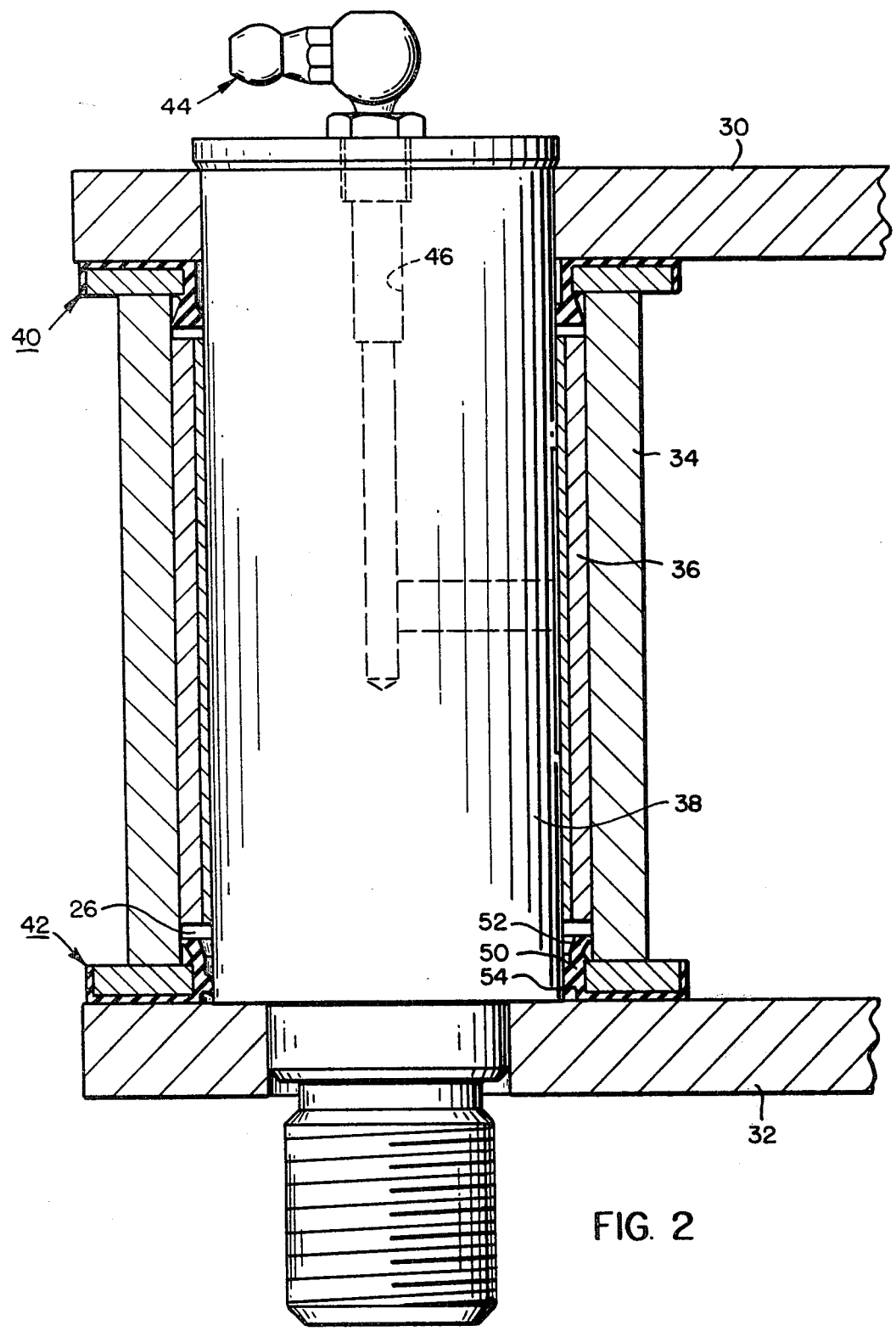
FIG. 2 is a partial cross-sectional view through a truck shackle bracket assembly showing two additional combination thrust washer and seal embodiments of the present invention.

FIG. 2 shows a spring shackle bracket assembly including a pair of brackets 30 and 32, a leaf spring eye 34, a bushing 36 pressed into the spring eye 34, a shackle pin 38 and a pair of combination thrust washer and seal articles 40 and 42 according to additional and different embodiments of the present invention. Two different thrust washer and seal articles 40 and 42 are shown for purposes of illustration only. Normally in any particular installation using two combination thrust washer and seal articles of this invention, two of the same design would be used. In addition, FIG. 2 shows a grease fitting 44 and grease lines 46 for use with a purgeable combination thrust washer and seal 42 for use if the design is one in which grease is to be purged through the bushing. If the design is one in which grease is not to be purged through the bushing, then the grease fitting 44 and grease lines 46 would not be used and a combination thrust washer and seal would be used which is not grease purgeable, such as the thrust washer and seal 40.

Each of the combination thrust washer and seals 40 and 42 have the same basic features of the thrust washer and seal 10 of FIG. 1 of an annular, ring-shaped, metal thrust washer and an annular elastomeric seal body having an anchor portion and an axially extending sealing lip having a proximal end adjacent the I.D. of the washer and a distal end adapted to sealingly contact at least one of an I.D. and an O.D. cylindrical surface. In addition, the elastomeric material also includes a wear-resistant layer substantially covering the outer radial surface of the washer.

In the combination thrust washer and seal 40, the distal end of the sealing lip is identical to the distal end 24 of the sealing lip 22 in FIG. 1 and has an uncompressed radial thickness greater than the radial distance between the O.D. of the pin 38 and the I.D. of the spring eye 34; the distal end of the sealing lip is press-fitted into the space 26 to provide the seal.

The combination thrust washer and seal 42 is designed to be grease purgeable for use in applications in which grease is to be purged through the bushing. In this embodiment, a seal body 50 has a primary sealing lip 52 and an auxiliary, grease purgeable sealing lip 54.

Figure 3:
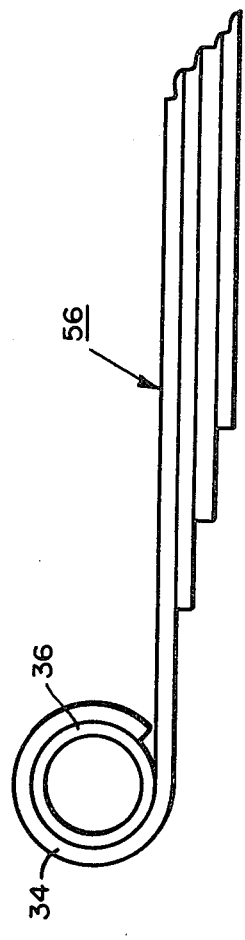
FIG. 3 is a partial cross-sectional view through a spring eye and bushing.

FIG. 3 is a side view of part of a truck leaf spring 56 showing the spring eye 34 and bushing 36 of FIG. 2 from a different direction to even more clearly show the arrangement of parts in FIG. 2.

This invention has been described in detail with particular reference to preferred embodiments thereof, but it will be understood that variations and modifications can be effected within the spirit and scope of the invention as described hereinabove and as defined in the appended claims. For example, the layer of elastomer covering the radial surface of the washer is preferably on the outside of each washer, (as shown in FIG. 2), for preventing wear between the steel thrust washer rubbing against the aluminum bracket, however, if this is not a concern then the rubber layer can be omitted or can appear on the opposite face of the thrust washer. Further, while the washer is preferably metal and the seal material is preferably an elastomer bonded to the metal washer, other materials and other means for attachment can be used. This invention is useful in other applications than spring shackle bracket assemblies, as will be understood by those skilled in the art.

What is claimed is:

1. A method for preventing contaminants from entering the bushing-pin area of a spring shackle bracket assembly including a pair of spaced-apart brackets, a spring eye positioned between said brackets, a bushing inside of said spring eye, and a pin extending between said brackets and inside of said bushing, said method comprising the steps of: bonding an annular elastomeric seal body to an annular ring-shaped metal thrust washer adapted for use in said assembly to provide a combination thrust washer and seal article, providing said seal body with a sealing lip having a proximal end adjacent the I.D. of the washer and extending axially therefrom away from said washer and having a distal end adapted to sealingly contact at least one of the I.D. of said spring eye and the O.D. of said pin, installing one of said combination thrust washer and seal articles between each end of said spring eye and the adjacent one of said brackets, and press-fitting said distal end of said sealing lip in the space between the O.D. of said pin and the I.D. of said spring eye.

2. The method according to claim 1 including preventing wear between a thrust washer portion of said combination thrust washer and seal article and an adjacent bracket by providing a layer of said annular elastomeric seal body covering substantially the entire outer radial surface of said thrust washer portion, said outer radial surface being on the opposite side of said thrust washer from said distal end of said seal body.

3. The method according to claim 1 including providing said distal end with an uncompressed radial thickness greater than the radial distance between the O.D. of said pin and the I.D. of said spring eye, and press-fitting said distal end between said spring eye and pin to seal said space and prevent contaminants from entering into the bushing pin area.

4. The method according to claim 1 including providing said seal body with an auxiliary lip extending radially inwardly from the I.D. of said washer and extending axially in the opposite direction from that of said sealing lip, whereby said auxiliary lip can purge grease from said radial space, and including the step of purging grease from said radial space past said auxiliary lip.

5. The method according to claim 1 including providing said thrust washer with a pair of flat continuous radial surfaces that are perpendicular to the axis of the thrust washer.

6. A method for sealing the radial space between the O.D. of a pin extending through a pair of spaced-apart brackets and the I.D. of a housing surrounding the pin and located between said brackets, against the flow of contaminants through said radial space, comprising the steps of: installing a combination thrust washer and seal article between each end of said housing and the adjacent one of said brackets, said article including an annular elastomeric seal body bonded to an annular ring-shaped, rigid, metal thrust washer having a pair of flat continuous radial surfaces that are perpendicular to the axis of the thrust washer, said seal body having a sealing lip having a proximal end adjacent the I.D. of said washer and extending axially therefrom and having a distal end adapted to sealingly contact at least one of the I.D. of said housing and the O.D. of said pin; and press-fitting said distal end of said sealing lip in said radial space.

7. The method according to claim 6 including providing said seal body with an auxiliary lip extending radially inwardly from the I.D. of said washer and extending axially in the opposite direction of from that of said sealing lip, whereby said auxiliary lip can purge grease from said radial space, and including the step of purging grease from said radial space past said auxiliary lip.

8. The method according to claim 6 including providing said distal end with an uncompressed radial thickness greater than the radial distance between the O.D. of said pin and the I.D. of said housing, and press-fitting said distal end between said pin and housing to seal said radial space.

* * * * *

UNITED STATES PATENT AND TRADEMARK OFFICE
CERTIFICATE OF CORRECTION

PATENT NO. : 4,270,759
DATED : June 2, 1981
INVENTOR(S) : Dennis N. Denton and Martin E. Benjamin It is certified that error appears in the above—identified patent and that said Letters Patent is hereby corrected as shown below:

Claim 7, line 4, delete "of" first occurrence.

Signed and Sealed this

Twenty-fifth Day of August 1981

[SEAL]

Attest:

GERALD J. MOSSINGHOFF

Attesting Officer

Commissioner of Patents and Trademarks